March 31, 1970   J. A. PERSSON   3,504,093
INDUCTION FURNACE APPARATUS FOR THE MANUFACTURE OF METAL CARBIDE
Filed Nov. 1, 1968

INVENTOR
JOHN A. PERSSON
BY D. Laurena Padilla
ATTORNEY

United States Patent Office 3,504,093
Patented Mar. 31, 1970

3,504,093
INDUCTION FURNACE APPARATUS FOR THE MANUFACTURE OF METAL CARBIDE
John A. Persson, Kenmore, N.Y., assignor to Union Carbide Corporation, New York, N.Y., a corporation of New York
Filed Nov. 1, 1968, Ser. No. 772,705
Int. Cl. H05b 5/00; C22d 7/08
U.S. Cl. 13—26                                            11 Claims

ABSTRACT OF THE DISCLOSURE

An apparatus for the continuous production of metal carbide products is provided. The apparatus is characterized by a columnar furnace having a hollow shaft into which the reactant materials are fed, and a cooling zone positioned immediately adjacent a heating zone along the shaft. A temperature drop in excess of 1000° C. is experienced from the upper part of the shaft to the lower part of the shaft with this construction, thereby enabling metal carbide products to be continuously produced and removed from the furnace without adverse effects due to oxidation.

FIELD OF INVENTION

This invention relates to the manufacture of refractory metal carbide agglomerates suitable for use as metallurgical additions to molten steel. More particularly the present invention relates to apparatus for the making of carbide products such as vanadium carbide, columbium carbide, tantalum carbide and titanium carbide for such use.

The use of refractory metal carbide agglomerate, e.g. vanadium carbide, as an addition to molten steel is a rather common industrial practice and it has been considered important that these agglomerates, in addition to being relatively strong and dense, have a very low oxygen content, e.g. less than 2%.

Various techniques have been proposed for making materials of this type, for example by reacting mixtures of metal oxides and carbon at high temperatures under vacuum or inert gas atmospheres. These practices have been successful to a large extent; however, they have required the use of rather expensive equipment and have also required rather long processing times, up to 24 hours and longer in the case of vacuum processes. Furthermore, difficulty is encountered in the manufacture of carbides of this type because of the change of resistance of the charge in the furnace or of the products of the reaction, these changes in electrical resistance adversely affecting proper control of the reaction. At temperatures at which the oxides are reduced by carbon, the reaction products become electrical conductors having specific resistances ranging from 1 to 1000 ohm inches. At temperatures above 1000° C. i.e. during the reaction process, the resistances decrease rapidly with increasing temperatures. The decrease in resistance coupled with the attendant rise in temperature causes an unstable electrical condition to occur and current in the furnace is channeled through low resistance paths. As a result, the product is often nonuniform in its properties causing much waste and inefficient operation.

A partial remedy to the aforementioned problems is set forth in U.S. Patent 2,840,458 wherein a plurality of electrically conductive bars are positioned in the furnace transversely to the intended flow of current and a granular resistance material is placed between bars. The reaction mixture is placed above and below the bars and a current is passed through the granular resistance material. The bars are thereby heated thus forming a heating element having a large heating surface within the reaction mixture. When current flow is stopped, the mix is allowed to cool.

Such a process is not capable of producing the desired products on a continuous basis and furthermore requires as much as six or seven days to cool a batch of material. There is therefore still a great need in the industry for an apparatus which will overcome the foregoing problems quickly and efficiently contrary to the tedious process above-described.

It is therefore an object of the present invention to provide an uncomplicated and relatively inexpensive apparatus for rapidly producing refractory metal carbide agglomerates suitable for use as metallurgical additions in the manufacture of steel.

SUMMARY OF THE INVENTION

Broadly, the apapratus of the invention comprises a columnar furnace having a hollow shaft into which feed material is continuously supplied, the furnace being provided with a refractory lining in at least a major portion of the upper half of the column; energizing means for generating heat within the refractory lining to provide a radiant heating zone in the upper portion of the shaft; and cooling means for cooling the lower half of the shaft, the cooling means being positioned immediately adjacent the lower part of the heating zone along the shaft. In the preferred embodiment, means for automatically removing the metal carbide products from the opening in the lower part of the furnace shaft are provided.

The apparatus of the invention enables the continuous production of metal carbides to be easily accomplished. By continuously feeding the material to the top of the furnace shaft and removing the products from the bottom, a gravity fed continuous operation is effected. The apparatus permits the continuous operation primarily because of the two closely positioned temperature zones above-described. Thus the metal carbide is formed in the upper half of the furnace shaft in a radiant heat zone in excess of 1500° C. and then substantially immediately cooled as it passes from the hot zone to the cool zone within the shaft thereby enabling it to be removed as a finished product at the bottom of the shaft at a temperature of below 400° C.

It is preferable that the refractory furnace lining surrounding the shaft be composed of graphite since this material is equally suitable for heating as well as thermal dissipation. Thus the graphite material can be extended the entire length of the shaft if desired and functions equally well in both the hot and cold zones. In the upper part of the shaft, the graphite is a susceptor which intercepts the magnetic field developed by a low frequency current flowing through inductor coils and thereby becomes a heat source whereas in the lower section of the shaft, the product is cooled by thermal conduction to the graphite walls which radiate to cooling plates surrounding this section of the furnace.

DESCRIPTION OF THE DRAWING

The invention will be more readily understood by referring to the drawing wherein.

Figure 1:
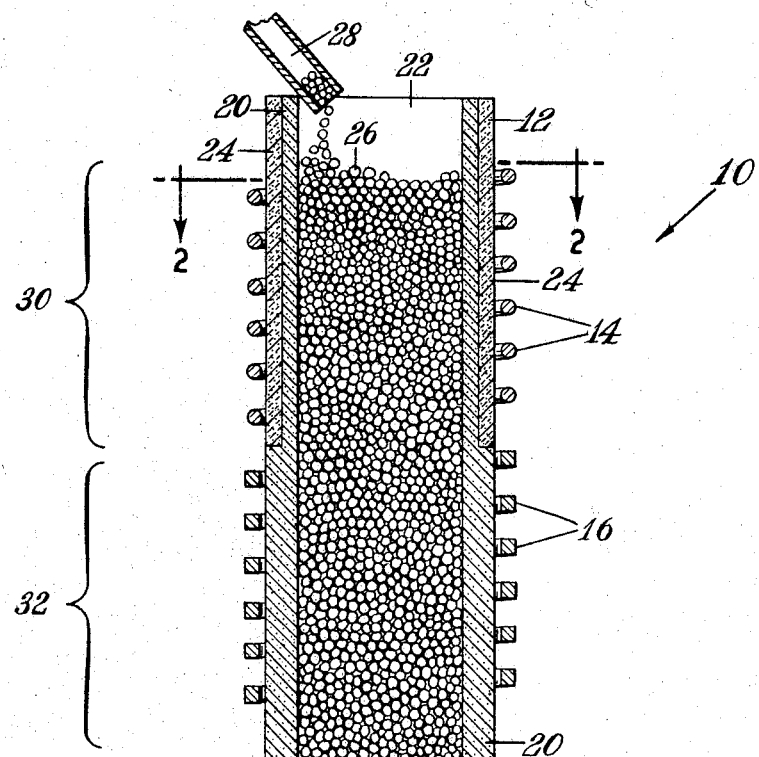
FIGURE 1 is an elevational view, partly in section, of the apparatus of the invention.

Referring to the drawing, there is shown in FIGURE 1 an apparatus designated generally by the numeral 10 which includes a columnar furnace 12, induction coils 14, cooling means 16 and material removal means 18. The furnace is equipped with a refractory lining 20 such as graphite, which extends along substantially the entire length of the furnace and envelops a shaft 22. The upper portion of the furnace is also provided with an insulating material such as thermatomic carbon 24 which surrounds the graphite lining 20. The shaft 22 is filled with metal oxide-carbon agglomerates 26 which are continuously fed to the furnace from feed tube 28. As the agglomerates descend along the shaft, they pass through a heat zone 30 where carbon and the metal oxide react to form the metal carbide and carbon monoxide, the latter escaping up through the shaft and out the top of the furnace. As hereinbefore explained, the graphite liner 20 is a susceptor in the upper portion of the furnace and becomes a heat source by intercepting the magnetic field produced by the current in coils 14. A temperature of between about 1500° C. and 1900° C. is used to produce vanadium carbide and other refractory metal carbide products such as CbC, TaC and TiC and is readily achieved in the heat zone 30. As the metal carbide agglomerates pass from heat zone 30 they immediately enter cold zone 32 and are cooled. The cooling means 16 may be formed of any suitable material such as copper and may be water cooled, if desired. In the preferred embodiment, the cooling means 16 comprises a spirally wound copper tube in contact with the furnace outer wall through which a fluid coolant such as water, is passed.

The cooled products exit at the bottom of the furnace shaft into removing means 18 which comprises a concavely contoured container 34 hingeably mounted by pivot pin 36 and supported by bar 38. The products are deposited into bins 40, 42 continuously by oscillating container 34 about pivot pin 36. The oscillation may be provided by manual manipulation but is preferably motor operated. The frequency of oscillation will also control the rate of descent of the agglomerates in the shaft to some degree and thus can be designed to coincide with proper heating and cooling cycles.

The agglomerates 26 are suitably in the form of briquets 1¾" x 1½" x 1" and are formed by pressing a mixture of finely divided metal oxide, carbon, and a suitable cereal binder. The amount of carbon in the agglomerates 26 is suitably from about 100 to 110% of the amount theoretically required to produce the desired metal carbide in order to ensure a low oxygen, i.e. less than 2% oxygen final product.

Figure 2:
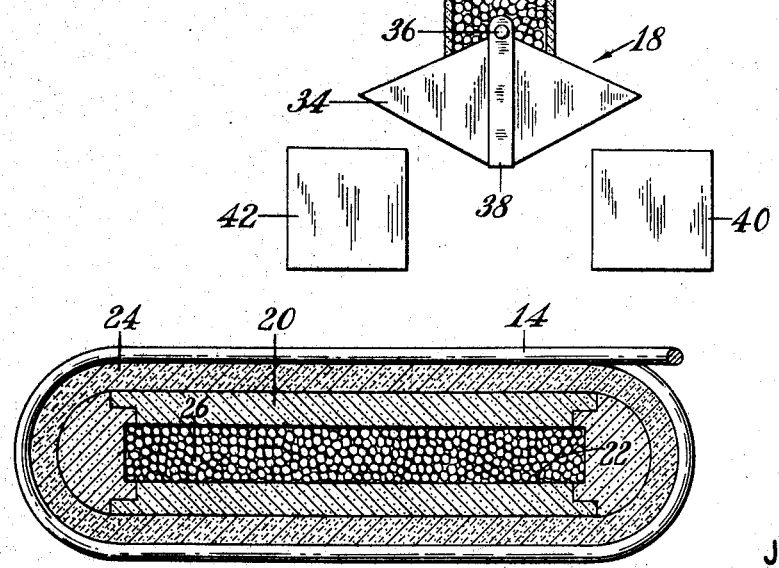
FIGURE 2 is an enlarged cross sectional view of the apparatus taken along lines 2—2 in FIGURE 1.

FIGURE 2 illustrates the apparatus in cross section. As there shown, the shaft 22 is of a generally rectangular shape and graphite liner 20 is composed of four sections joined at their edges. The cross sectional area of the shaft 22 may be of any shape but for best results, it should not be too large since the heat radiates from the graphite liner toward the center of the shaft.

The following example will further illustrate the apparatus of the invention.

EXAMPLE

A metal oxide-carbon mixture was prepared from the following:

$V_2O_3$ (sized finer than 65 mesh), 400 lbs.
Thermatomic carbon (sized finer than 200 mesh), 136 lbs.
Mogul binder, 10 lbs.

The mixture was formed into pellets ½" x ¼" (diameter) by rolling on a disc pelletizer.

The pellets were then fed at a rate of about 50 lbs. per hour into the graphite shaft of an apparatus similar to that shown in the drawing. The shaft was 9 feet long and had an inner diameter of 6 inches. Twenty-five inches from the top of the shaft an induction coil heated reaction zone 52 inches long was provided. The temperature in the heated reaction zone was in the range of 1700–2100° C. The lower 5 feet of the the graphite tubes was water cooled. Argon was introduced at the lowermost portion of the shaft at a rate of 60 cubic feet per hour.

The product withdrawn from the bottom of the shaft, at a temperature of less than 400° C. analyzed 13.96% carbon and 0.94% oxygen. The agglomerate product was hard and dense and about ¼ to ⅓ of the original pellet size.

The thickness of the graphite lining is a somewhat important design consideration in the apparatus of the invention. In the heating zone the lining should be uniformly dimensioned as to thickness so that a zone of equal high resistance is provided. This enables a uniform heat to be generated within and radiated from the graphite lining to the charge in the shaft. Generally a wall thickness of 3 inches to 5 inches is desired in the upper portion of the furnace for proper heat generation. Normally, a 60 hertz frequency source to energize the surrounding coils is employed although between 30 to 180 hertz sources also impart efficient electrical energy utilization. The graphite lining in the cold zone of the furnace should be no greater than required for mechanical strength.

The immediate cooling of the metal carbide products is necessary to avoid oxidation when the products are removed from the furnace. To effect continuous production, the apparatus must be capable of reducing the temperature of the products by more than 100° C. and preferably more than 1500° C. in a short time. Thus the cooling zone also must be greater in length than the width or average cross sectional dimension by a factor of at least 2 to accomplish this objective. Finally, the feed rate of the metal carbide products may be controlled to obtain the low exit temperature.

What is claimed is:
1. An apparatus for the continuous production of metal carbide products comprising:
   (a) a columnar furnace having a hollow shaft with an upper opening for receiving feed material and a lower opening for discharging the metal carbide products said furnace having a refractory lining enclosing said shaft;
   (b) energizing means for generating heat within the upper half of said refractory lining to provide a radiant heating zone in the upper portion of said shaft;
   (c) cooling means in contact with a major portion of the lower half of said refractory lining, said portion beginning just below the heating zone, whereby a cooling zone is established immediately adjacent said heating zone; and
   (d) means for automatically removing said metal carbide products from said lower opening in said furnace.

2. The apparatus of claim 1 wherein said refractory lining in said heating zone is graphite.

3. The apparatus of claim 2 wherein said graphite lining is between 3 inches to 5 inches thick.

4. The apparatus of claim 2 wherein the ratio of the length of said cooling zone to the average cross section dimension of said shaft is at least 2.

5. The apparatus of claim 2 wherein said graphite lining extends through a major portion of said cooling zone.

6. The apparatus of claim 5 wherein said metal carbide product is vanadium carbide.

7. The apparatus of claim 4 wherein said metal carbide product is cooled at least 1000° C. in said cooling zone.

8. The apparatus of claim 2 wherein said energizing means comprises a plurality of induction coils surrounding the upper half of said furnace and a current through said coils causing a magnetic field to contact and heat said graphite liner.

9. The apparatus of claim 4 wherein said cooling means comprises a spirally wound tube surrounding the lower half of said furnace, and a cooling fluid in said tube.

10. The apparatus of claim 1 wherein said automatic removing means comprises a container hingeably mounted just below the lower opening in said furnace and means to continuously reciprocate said container below said opening.

11. The apparatus of claim 10 wherein said container is concavely contoured.

References Cited
UNITED STATES PATENTS

| | | | |
|---|---|---|---|
| 2,814,560 | 11/1957 | Ballantine | 75—10 XR |
| 1,859,680 | 5/1932 | Neuhauss | 13—27 |
| 2,647,826 | 8/1953 | Jordan | 13—25 XR |
| 2,840,458 | 6/1958 | Hamister | 13—25 XR |
| 2,671,123 | 3/1954 | Sherrick | 13—20 |
| 2,673,228 | 3/1954 | Kistler | 13—25 XR |
| 2,768,277 | 10/1956 | Buck et al. | 13—25 XR |
| 2,876,094 | 3/1959 | Lusby | 75—10 XR |
| 3,213,177 | 10/1965 | Diefendorf | 13—31 |
| 3,295,559 | 1/1967 | Beasley | 13—26 XR |

H. B. GILSON, Primary Examiner

U.S. Cl. X.R.

75—10

PO-1050
(5/69)

UNITED STATES PATENT OFFICE
CERTIFICATE OF CORRECTION

Patent No. 3,504,093.              Dated March 31, 1970

Inventor(s) J. A. Persson

It is certified that error appears in the above-identified patent and that said Letters Patent are hereby corrected as shown below:

In the specification, column 4, line 24, "100°C." should read -- 1000°C. -- .

SIGNED AND
SEALED

AUG 4 - 1970

(SEAL)
Attest:

Edward M. Fletcher, Jr.
Attesting Officer

WILLIAM E. SCHUYLER, JR.
Commissioner of Patents